United States Patent
Nelson

(10) Patent No.: US 6,465,965 B2
(45) Date of Patent: Oct. 15, 2002

(54) METHOD AND SYSTEM FOR ENERGY CONVERSION USING A SCREENED-FREE-ELECTRON SOURCE

(76) Inventor: Lawrence Nelson, 8900 W. 50th Ave., Arvada, CO (US) 80002

(*) Notice: Subject to any disclaimer, the term of this patent is extended or adjusted under 35 U.S.C. 154(b) by 0 days.

(21) Appl. No.: 09/822,579

(22) Filed: Mar. 30, 2001

(65) Prior Publication Data

US 2002/0067131 A1 Jun. 6, 2002

Related U.S. Application Data

(63) Continuation-in-part of application No. 09/358,746, filed on Jul. 21, 1999, now abandoned.
(60) Provisional application No. 60/093,789, filed on Jul. 23, 1998, provisional application No. 60/254,430, filed on Dec. 11, 2000, and provisional application No. 60/259,967, filed on Jan. 2, 2001.

(51) Int. Cl.$^7$ .................................................. H01J 7/24
(52) U.S. Cl. .............................. 315/111.81; 315/39.63; 315/3.5; 250/305; 250/307; 372/74; 372/86; 378/114
(58) Field of Search ................ 315/1, 3.5, 39.63, 315/44, 5.25, 111.81, 111.41, 500; 250/305, 307, 310, 311; 372/74, 81, 82, 86, 38.02; 378/113, 114, 119

(56) References Cited

U.S. PATENT DOCUMENTS

| | | | | |
|---|---|---|---|---|
| 4,220,853 A | * | 9/1980 | Feuerbaum et al. | 250/310 |
| 5,018,180 A | | 5/1991 | Shoulders | 378/119 |
| 5,097,472 A | * | 3/1992 | Chenausky | 372/38 |
| 5,123,039 A | | 6/1992 | Shoulders | 378/119 |
| 5,302,881 A | * | 4/1994 | O'Loughlin | 315/111.21 |
| 5,319,322 A | * | 6/1994 | O'Loughlin | 331/81 |

OTHER PUBLICATIONS

Melissinos, Adrian C., "Experiments in Modern Physics," Academic Press, Inc. 1966, pp. 57–81.
Forward, Robert L., "Extracting electrical energy from the vacuum by cohesion of charged foliated conductors," The American Physical Society, Physical Review B, vol. 30, No. 4, Aug. 1984.
Proceedings, vol. L1, No. 7, "Koninklijke Nederlandsche Akademie Van Wetenschappen".
Sparnaay, M.J., "Measurements of Attractive Forces Between Flat Plates," Physica XXIV, 751–764, 1958.
Feinberg, Gerald, et al., "General Theory of the van der Walls Interaction: A Model–Independent Approach," Physical Review A, vol. 2, No. 6, Dec. 1970.
Description of Heat Wave Plasma Electron Source.

* cited by examiner

Primary Examiner—Haissa Philogene

(57) ABSTRACT

A method and device for providing power to a load are disclosed. A beam of free electrons is directed from a free-electron source, such as an electron gun, into an enclosing conductive surface. The free-electron source includes a cathode, which is maintained at a negative voltage with respect to the enclosing conductive surface. A region around the free-electron source is maintained in a vacuum. The system is configured to switch over a time period between two configurations. In the first configuration, the enclosing conductive surface is isolated from a ground. In the second configuration, the enclosing conductive surface is in electrical communication with the ground. Capacitive energy is discharged from the enclosing conductive surface when in the second configuration with an electrical circuit arrangement and provided to the load.

22 Claims, 10 Drawing Sheets

METHOD AND SYSTEM FOR ENERGY CONVERSION USING A SCREENED-FREE-ELECTRON SOURCE

CROSS-REFERENCES TO RELATED APPLICATIONS

This application is a continuation-in-part application of application Ser. No. 09/358,746, entitled "FREE ELECTRON CONDENSATION VOLTAGE GAIN AND POWER GENERATION DEVICE," filed Feb. 7, 2001 by Lawrence L. Nelson, which is a continued-prosecution-application of the same serial number filed Jul. 21, 1999 now abandoned, which claims the priority of Prov. Appl. No. 60/093,789, filed Jul. 23, 1998, the disclosures of which are incorporated herein by reference in their entirety for all purposes. This application also claims priority to the following provisional applications: Appl. No. 60/254,430, entitled "FREE ELECTRON FIELD STACKING ENERGY SOURCE," filed Dec. 11, 2000; and Appl. No. 60/259,967, entitled "FREE ELECTRON STACKING POWER GENERATION DEVICE," filed Jan. 2, 2001, the disclosures of which are incorporated herein by reference in their entireties for all purposes.

BACKGROUND OF THE INVENTION

The present invention relates generally to a method and system for energy conversion and relates more specifically to a method and system for energy conversion using a screen-free-electron source.

While working on the invention of the incandescent light bulb, Thomas Edison observed that a current flowed between the hot filament of a bulb and a nearby metal plate, and that the current abated over time, eventually falling to zero. He further noted that the current would return if a small voltage were applied between the plate and filament, with the current abating as before when that voltage was removed. Although the current was eventually recognized as a flow of free electrons between the filament and plate, the current abatement was anomalous when compared with expectations for a current of electrons experiencing a Coulomb interaction. Free electrons expelled from the cathode surface have a standard Maxwell-Boltzmann exponential thermal energy distribution, and the electrical potential produced by the free electrons would necessarily have a minimum between the filament and palte that would act as a barrier to the free-electron flow. An increase in the magnitude of the potential minimum by 70% would be required to halve the current flow, resulting in a consequent 70% increase in the expelling force experienced by the electrons outside of that minimum. With the cathode current unchanged and the free-electron expulsion rate nearly doubled, the charge buildup that led to the potential increase would become depleted nearly instantaneously, correcting the buildup. The return of the current following the introduction of an external voltage implies that the abatement is due to a space charge or electron cloud that forms around the cathode, but that cloud buildup would be forbidden unless the electrical field of the free electrons were diminished or screened. Such screening of a free-electron source is used in embodiments of the invention.

SUMMARY OF THE INVENTION

Embodiments of the invention provide a method and device for providing power to a load. A beam of free electrons is directed from a free-electron source, such as an electron gun, into an enclosing conductive surface. The free-electron source includes a cathode, which is maintained at a negative voltage with respect to the enclosing conductive surface. A region around the free-electron source is maintained in a vacuum. The system is configured to switch over a time period between two configurations. In the first configuration, the enclosing conductive surface is isolated from ground. In the second configuration, the enclosing conductive surface is in electrical communication with ground. Capacitive energy is discharged from the enclosing conductive surface when in the second configuration with an electrical circuit arrangement and provided to the load.

In some embodiments the cathode is a hot cathode, while in other embodiments it is a cold cathode. In one embodiment, the electrical circuit arrangement includes a diode and a capacitor. In another embodiment, the electrical circuit arrangement includes a capacitor and an inductor configured to provide current oscillations. In a further embodiment, the beam of free electrons is constrained magnetically so that its trajectory ensures the free electrons travel to an end of the enclosing conductive surface opposite the free-electron source before contacting the enclosing conductive surface. The free electrons may be temporarily interned in a magnetic bottle. The magnetic bottle may be provided by a pair of aligned permanent magnets. In certain embodiments, the beam of electrons is derived from a cloud of electrons that may be formed. Directing the beam of electrons may include providing a flow of gas, such as a flow of inert gas, from the free-electron source towards an end of the enclosing conductive surface. In a particular embodiment, directing the beam of electrons includes slowing the electrons.

In some embodiments, a conducting grid is included in electrical communication with the enclosing conductive surface to prevent charges from the enclosing conductive surface from being drawn into the free-electron source. In one such embodiment, the conducting grid and the cathode are hemispherical.

In another embodiment, the enclosing conductive surface comprises a plurality of conductive subenclosures housed within a nonconducting vacuum enclosure, each of the subenclosures being shielded from other subenclosures. The beam of free electrons is successivly deflected into the conductive subenclosures over the time period. In some embodiments, the beam of free electrons may be focused, such as by providing a plurality of electron guns configured to direct the beam of free electrons through a confined region.

BRIEF DESCRIPTION OF THE DRAWINGS

These and other embodiments of the present invention, as well as its advantages and features are described in more detail in conjunction with the text below and the attached figures, in which similar reference numerals are used throughout the several drawings to refer to like elements.

DESCRIPTION OF THE SPECIFIC EMBODIMENTS

Figure 1:
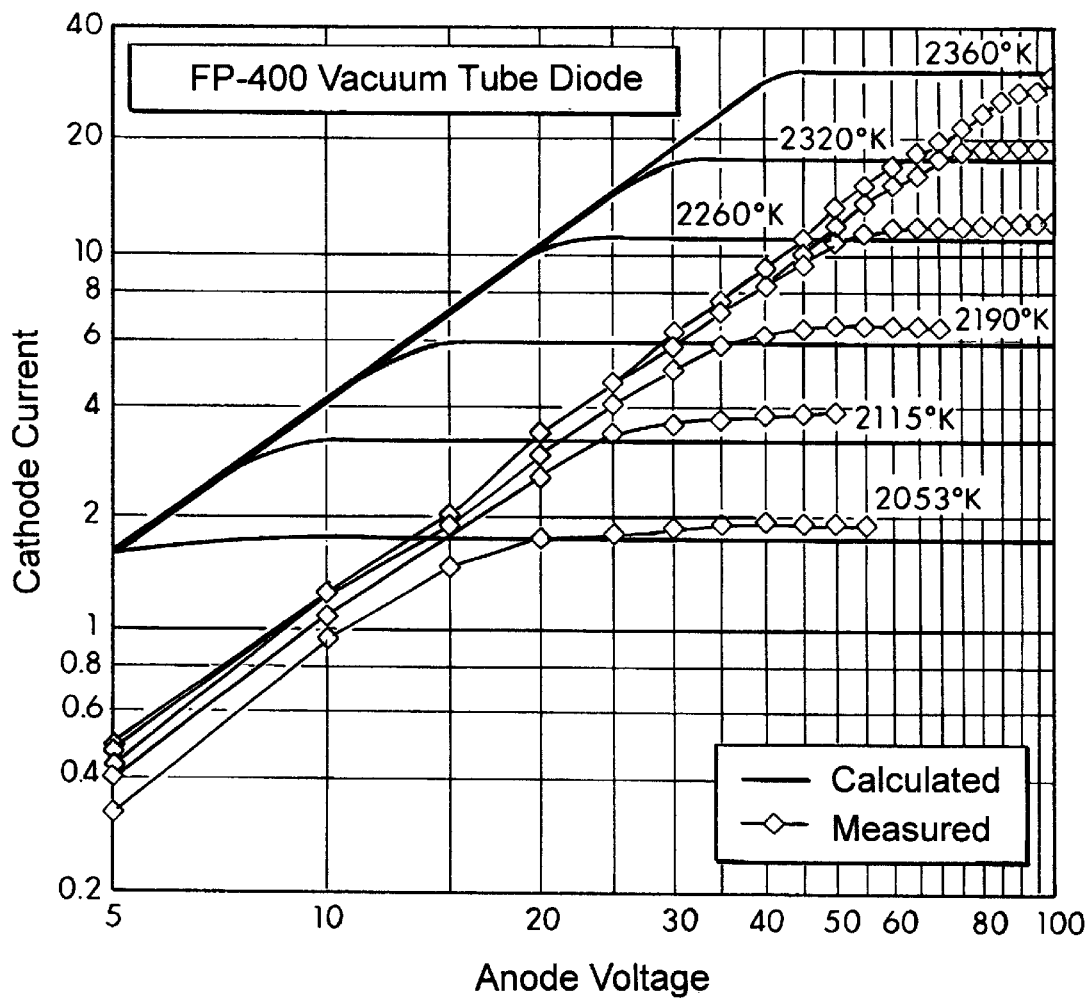
FIG. 1 compares measured and calculated current profiles for an FP-400 vacuum tube diode.

The screening effect used by the present invention exploits an effect similar to that described in U.S. Pat. Nos. 5,018,180 and 5,123,039 ("the Shoulders patents"), both of which are herein incorporated by reference for all purposes. The electron-screening effect is related to quantum screening that results from vacuum polarization. Vacuum polarization results from vacuum fluctuations in which virtual particles are permitted to exist briefly and then disappear in accordance with the laws of physics—the time of their duration is limited by their total energy and by the Heisenberg uncertainty principle; the total charge is conserved so that charged particles are created and annihilated in charge pairs, e.g. one electron and one positron are created together; and the boundary conditions of the governing quantum-mechanical equation, such as the Dirac equation, are satisfied. The possibility of extracting electrical energy from the vacuum by exploiting the existence of vacuum fluctuations has been shown in R. L. Forward, "Extracting Electrical Energy from the Vacuum by Cohesion of Charged Foliated Conductors," Phys. Rev. B, 30, 1700 (1984).

Vacuum polarization arises when virtual charge pairs, such as a virtual electron and positron, are displaced slightly by an external electrical field during their brief existence. That slight displacement acts to screen the electrical field just as the polarized molecules in a dielectric material would. In a dielectric material, an external electrostatic field acts to draw the negative and positive particles in opposite directions, generating a slight opposing field. The total electrical field is slightly reduced from the source field, with the amount of reduction being proportional to the external field strength. The source electrostatic field is said to be screened by the dielectric field. In the case of vacuum polarization, the strength of the screening is related to the number of virtual charge pairs appearing in the vicinity of the electrostatic field, which is controlled by the number of allowable energy states.

Because virtual spin-½ fermions are required to meet the boundary conditions of the Dirac equation, when they appear in the vicinity of an atom or molecule they are only permitted to occur at energies that would fill one of the vacant energy states, or shells, of that atom or molecule. If their appearance is inside of a conducting medium, then they can only appear so as to fill one of the free energy states within the conductor. The number of vacant energy states in a vacuum is large, whereas the vacant states are quite limited in the vicinity of an atom where only a limited number of shells are permitted, or inside of a conductor where nearly all of the energy states are filled. This implies that the electrical field strength measured for electrons is shielded when measured on a macroscopic scale.

Quantum screening was confirmed in 1951 in an effect now referred to as the Lamb spectral shift, which measures the energy difference between the $2s_{1/2}$ and $2p_{1/2}$ shells of the hydrogen atom. The (nonrelativistic) Schroedinger equation predicts that the energies of the $2s_{1/2}$ and $2p_{1/2}$ orbitals will be identical, but vacuum polarization effects predict a slightly higher energy for the $2s_{1/2}$ shell, which penetrates to the nucleus and so experiences less screening. The Lamb spectral shift measures an energy difference of $4.372 \times 10^{-6}$ eV between the two orbitals, about 0.1 times the hyperfine splitting. Despite the smallness of this energy difference, the Lamb spectral shift predicts a Poynting vector having a magnitude about three times the energy flow output from the sun.

The effects of vacuum polarization predict the presence of an attractive force between conductors, as shown in H. B. G. Casimir, Proc. Kon. Ned. Akad. Wetenschap. B, 51, 793 (1948), which is herein incorporated by reference for all purposes. A measurement of this attractive force was presented in M. J. Spamaay, Physica, 24, 751 (1958), which is herein incorporated by reference for all purposes. Furthermore, vacuum polarization effects have been shown to affect electrostatic interactions in the form of the van der Waals force, as shown in G. Feinberg and J. Sucher, Phys Rev A, 2, 2395 (1970), which is herein incorporated by reference for all purposes. At large atomic separations r, the inclusion of vacuum polarization effects results in a potential proportional to $1/r^7$ instead of the nonrelativistic $1/r^6$ result.

Figure 2:
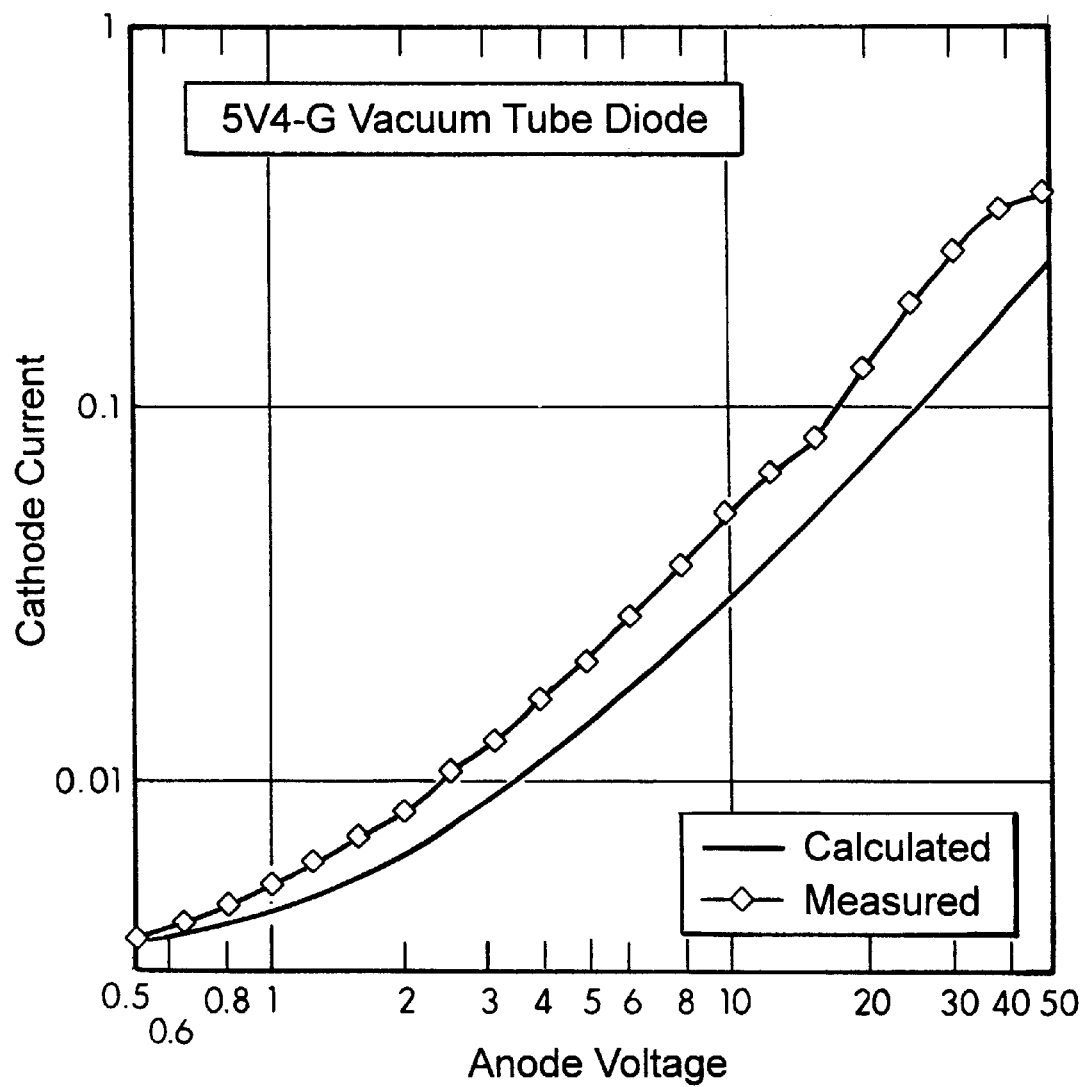
FIG. 2 compares measured and calculated current profiles for a 5V4-GA vacuum tube diode.

The effects of electron screening may be seen with reference to FIGS. 1 and 2, in which calculated and measured current response profiles are compared for vacuum tube diodes. The calculated results were obtained by using classical electrodynamics and thermodynamics to model the load to current response of the vacuum diodes. A potential was determined iteratively, with the cathode-anode separation segmented into an array of cells $r_j$ and the thermal energy divided into increments $U_i = i\Delta u$. The density for each thermal-energy increment is given by $$D(U_i) = \frac{2I}{3kt} e^{-2U_i/3kT},$$

where k is the Boltzmann constant, the expression being derived from the exponential distribution for a cathode temperature T. The charge density for a specific electron velocity, corresponding to current $I_i$, is $$\rho(U_i, r_j) = \frac{2I_i}{3\pi k t r_j^2} \sqrt{\frac{m_e}{2e[U_i - V(r_j)]}} \, e^{-2U_i/3kT},$$

where $m_e$ is the electron mass and V is the potential energy. With the charge density known for a particular iteration, the potential is calculated from Gauss's law to derive the electrical field, which is integrated to give the potential. The equation was solved iteratively with a radius segmentation of 2000 cells and a thermal-energy segmentation of 1000 cells, with convergence achieved after about 20–25 iterations.

Two diodes were modeled in this way, the FP-400 diode manufactured by General Electric, which uses a 0.13-mm-diameter tungsten cathode, and the 5V4-GA tube also manufactured by General Electric, which uses a 1.6-mm-diameter oxide-coated indirectly heated cathode. Data for the FP-400 were taken from the literature, Experiments in Modern Physics, Adrian C. Milissinos, Acadamic Press, pp. 56–81 (Academic Press, 1966), which is herein incorporated by reference for all purposes. Data for the 5V4-GA were measured directly and compared with manufacturer data sheets. The cathode current used in the models was taken from the saturation current of the measurements, thereby eliminating the need to estimate the cathode emission and leaving only end effects and nonuniform cathode heating as a source of inaccuracy for the model. The calculated and measured values for those studies are shown in FIG. 1 for the FP-400 and in FIG. 2 for the 5V4-GA. For the FP-400, the calculated results overpredicted the cathode current by more than a factor of three in the space-charge-limited region of the response, while for the 5V4-GA, the modeled current is about 50% less than predicted. The difference is qualitative behavior is believed to be due to differences in the ratio of cathode to anode diameters for the two diodes and to differences in oxide coating roughness.

Further effects are seen by a low-energy, high-current electron gun used to neutralize static surface charge buildup for applications such as ion-propulsion systems and ion-etching semiconductor fabrication. A HeatWave Plasma Electron Source gun, model no. HWPES-250, was used. The gun produces an electron beam at up to 10 A of current with electron energies less than 1 eV and an unfocussed beam diverging as a 30°–45° cone. The noble gases used by the gun are essentially opaque to electron transmission at the energies quoted, and ions of those gases are far worse. In fact, the quoted operation of the gun, recommending a several-volt anode to control the beam indicates negatively charged ions, not positive ones, because the free electrons and ions are both drawn to the anode, buy if the ions were positively charged they would become instantly polarized and separated from the free electrons. Even if the ions were positively charged, the measured ion current of 1 mA would be one fortieth that required to balance the electron current. In terms of perveance, commonly used to describe plasmas, the electrons of the beam have a perveance of $150\times10^3$ while the ions present a perveance of $7.4\times10^3$, a ratio of about 20: 1.

The charge density for a uniformly dense beam is $$\rho = \frac{I}{\pi R^2}\sqrt{\frac{m_e}{2eV_a}},$$

where I is the beam current, R is the beam diameter, me is the electron mass, e is the elementary electron change, and $V_a$ is the acceleration voltage of the beam, taken to be 1 V in this case. Using Poisson's equation, $$\nabla^2\varphi = -\frac{\rho}{\varepsilon_0},$$

and neglecting the axial contribution to the second derivative, the charge density ρ results from a potential given by $$\varphi = \frac{I}{4\pi\varepsilon_0}\sqrt{\frac{m_e}{2eV_a}}\frac{r^2}{R^2} = 6\times10^5\frac{r^2}{R^2} \text{ volts}.$$

Taking the radial derivative to obtain the electrical field strength, the acceleration for the electrons in the beam can be calculated to be $$a(r) = \frac{e}{m_e}\frac{d\varphi}{dr} = \frac{I}{2\pi\varepsilon_0}\sqrt{\frac{e}{m_eV_a}}\frac{r}{R^2} = 5\times10^{16}\frac{r}{R^2}\frac{\text{meters}}{\text{s}},$$

where r and R are specified in meters. At the mouth of the gun, where the beam diameter is approximately 1 mm, the electrons outside of the r=R/2 radius—three quarters of the beam charge—would be moving radially outward faster than they are moving forward by 7 nm of forward travel, not expanding as a 30°–45° cone as measured.

If just the 1-mm-diameter sphere of charge located in the gun mouth and just touching the beam edge is considered, then the energy of the beam electrons at a typical target separation $R_t$ of 5 cm would thus be given by $$\Delta\varphi = \varphi(R_t) - \varphi(R) =$$

$$\frac{1}{4\pi\varepsilon_0}\frac{I}{\pi R^2}\sqrt{\frac{m_e}{2eV_a}}\left(\frac{4}{3}\pi R^3\right)\left(\frac{-1}{R_t} - \frac{-1}{R}\right) = 4\times10^8 \text{ volts}.$$

Such a classical calculation indicates that absent screening the electrons would arrive at the target with more than 400 MeV of energy, which would preclude operation of the electron gun.

In the Shoulders patents, electrical energy is converted with a discrete, contained, bundle of charged particles, which may be predominantly electrons, and which is referred to in the Shoulders patents as an "EV." The bundle is of relatively small size, such as on the order of 1 μm in the lateral dimension and has a high uncompensated electron charge, such as on the order of $10^8$–$10^{11}$ electron charges, i.e. with a charge of $1.6\times10^{-10}$–$1.6\times10^{-7}$C. The electrical potential at the edge of one of the described clusters would be $1.4\times10^6$V, but the acceleration is reported as 10 kV. Considering a sphere of charge and a Gaussian surface just enclosing that sphere, and estimating the electrical field produced as uniform over the surface of the sphere, Gauss's Law indicates that the flux, or electrostatic field strength times the surface area of the sphere, will be equal to the total charge enclosed divided by the vacuum permittivity:

$$E_\perp A_s = E_\perp(4\pi R^2) = \frac{Q_{enc}}{\varepsilon_0}.$$

Solving for the electrical field $E_\perp$ gives $$E_\perp = \frac{Q_{enc}}{4\pi\varepsilon_0 R^2} = 5.8\times10^{11} \text{ V/m}.$$

Multiplying by the elementary electrical charge and dividing by the mass of an electron gives the expected radial acceleration of the electrons at the edge of the sphere, $10^{23}$–$10^{26}$ m/s2. The electron clusters are described as traveling at 10% the speed of light, about $3\times10^7$ m/s, so that the acceleration would produce a cluster growing faster than it is moving forward in the absence of electron screening.

In order to charge a capacitor classically with unscreened electrons, the first electron is moved into the capacitor consuming no energy other than to overcome resistance. Moving the second electron into the capacitor requires the consumption of energy because of the repulsion from the first electron; moving the third electron requires twice that energy because it would have to work against the repulsion of the first two electrons, and so on. The energy E required to charge a capacitor of capacitance C to a voltage V can be shown to be given by E=½CV², which is returned when the capacitor is discharged.

According to embodiments of the invention, screened free electrons are moved into a charged hollow sphere that functions as a capacitor having a capacitance C=Q/V=R/ $4\pi\varepsilon_0$, where Q is the charge and R is the radius of the sphere. Once the electrons attach to the conducting material of the sphere, it may be discharged to extract electrical energy. By collecting electrons in a confined volume, their electrical fields may be stacked while those fields are screened. At least three methods may be used for producing the screened-free-electron capacitive structure: collecting free electrons in a magnetic bottle; slowing the free electrons by reducing their acceleration voltage, thereby increasing the charge density to be inversely proportional to the velocity; and increasing the cathode surface area or, equivalently, using multiple electron beams directed to the same volume, thereby increasing the density by increasing the beam current. The invention is not limited by such methods, however, and encompasses alternative and equivalent methods.

The principles of circuitry used in accordance with certain embodiments of the invention are now described, followed by specific examples. Generally, a beam of free electrons is directed with an electron gun into an enclosing metal surface that can be connected to or isolated from ground. The region encompassing the electron gun and enclosing the surface is maintained in a vacuum so that interactions with gas molecules may be neglected.

In one embodiment, the cathode is maintained at a negative voltage, so that while the conducting enclosure is connected to ground, the free electrons will be accelerated into the conducting enclosure and travel ballistically to the opposite side. After a period of time, the conducting enclosure is isolated from ground so that any free electrons that impact it cannot be discharged. When sufficient electrons have impacted on the conducting enclosure that it is charged to the same voltage as the cathode, free electrons will no longer be compelled to enter the conducting enclosure. There will, however, be electrons that remain in transit between the electron gun and opposite wall of the conducting enclosure as free electrons. As those free electrons impact on the surface of the conducting enclosure, they charge the conducting enclosure. The repulsion of the electrons bound within the conducting enclosure causes the surface to become charged to a greater voltage, thereby providing a method for producing a voltage in a circuit.

The resultingly charged conducting enclosure is then connected again to ground through a conversion device such as a resistor and the energy stored in the conducting enclosure, which acts capacitively, is released or discharged. These steps are cycled so that with the conducting enclosure grounded, free electrons are then provided from the electron gun to the opposite side of the conducting enclosure, filling it with electrons for the next cycle of isolating it from ground.

The power provided by such an arrangement may be calculated from its capacitive behavior. Denoting the capacitance of the conducting enclosure as C, and the total charge residing thereon as Q, the stored energy is $E=Q^2/2C$. The time period T over which the system is cycled, spending half of that time connected to ground and the other half isolated from ground, may be chosen equal to the time required for the electrons to travel from the electron gun to the other side of the conducting enclosure. The electrons that charge the conducting enclosure will be those that are in the process of traveling between the electron gun and the opposite side of the conducting enclosure when the capacitor was isolated from ground, over a period T12. The total charge collected is thus given by the product $Q=\frac{1}{2}I_C T$, where $I_C$ is the current of the cathode ray. Thus, the power available from the repeatedly discharged conducting enclosure is given by:

$$P = \frac{E}{T} = \left(\frac{1}{2}\frac{Q^2}{C}\right)\frac{1}{T} = \frac{1}{2CT}\left(\frac{I_C T}{2}\right)^2 = \frac{T}{8C}I_C^2.$$

The available power is thus proportion to the square of the cathode-ray current, which may be determined by the configuration of the apparatus.

Cathode currents of 1 A with heater filaments consuming 6 W are common for vacuum-tube devices. With the system having a 10-cm long conducting enclosure and an acceleration voltage of 10 V, the device would need to be switched at around 1 MHz to generate this cycle and would have a capacitance of about 50 pF. That configuration would make about 2.5 kW of power available.

Figure 3:
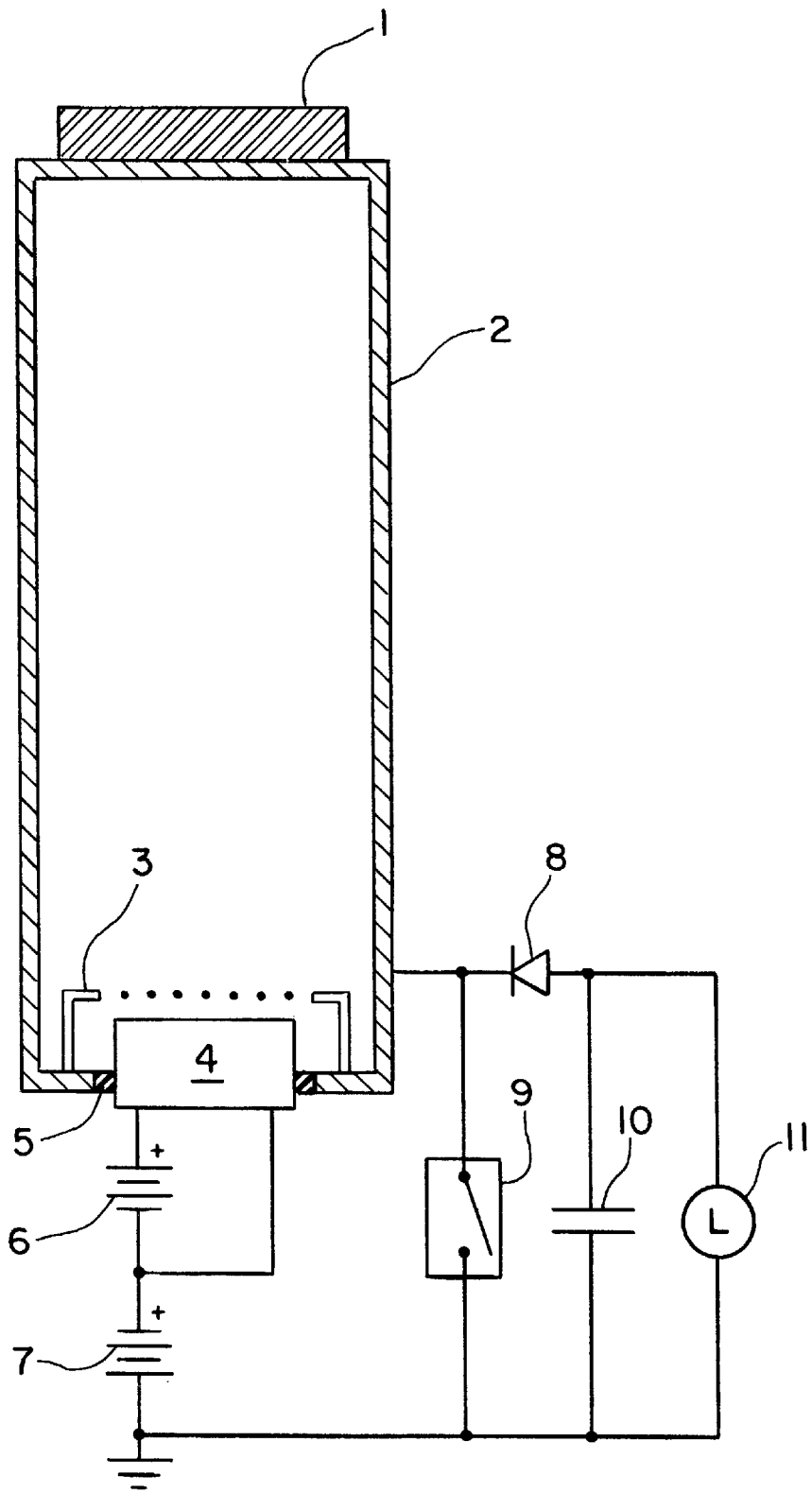
FIG. 3 is a cutaway schematic view of one embodiment of the invention.

FIG. 3 shows a cutaway schematic view of one embodiment of the invention. An electron gun 4 is situated so that its output is directed into a conducting enclosure 2 that is electrically isolated from the electron gun 4 by an insulator 5. The electron gun 4 may use a hot or cold cathode, but is pictured using a hot cathode powered by a current source 6. The electron gun 4 is maintained at a slightly lower potential, 1 to 10 V being typical, from ground, by means of a DC voltage source 7 and a high vacuum is maintained in the interior of the conducting enclosure 2. A permanent magnet 1 is provided to prevent the electrons from the electron gun 4 from spreading to the sides of the conducting enclosure 2 by the lack of focusing or by being diverted by an ambient magnetic field, but rather travel to the opposite end before coming into contact with the conducting enclosure 2, the magnet 1 causing them to travel in a helical path to the opposite end. A conducting grid 3 is provided which is electrically connected to the conducting enclosure 2 so that when the conducting enclosure 2 becomes charged, electrons are prevented from being drawn back to the electron gun 4. In one embodiment, the conducting enclosure 2 is electrically connected to an electrical circuit having a switch means 9, a large capacitor 10, a diode 8 and whatever device, or load 11, is being driven.

In operation, the switch 9 is closed initially so that the electrons from the electron gun 4 will be drawn through the conducting grid 3 and into the interior of the relatively higher potential of the grounded conducting enclosure 2. The switch 9 is kept closed for a sufficient period of time for the electrons from the electron gun 4 to travel across the interior of the conducting enclosure 2 and begin impacting on the opposite end. At that time, the switch 9 is opened so that the electrons which are traveling across the interior cavity of the conducting enclosure 2 will charge the conducting enclosure 2 as they come into contact with it rather than draining to ground. As in the previous discussion, the conducting enclosure 2 will thereby acquire a voltage.

The capacitor 10 is maintained at a lesser voltage, typically limited by the breakdown voltage of the switch 9, so that rather than charging the conducting enclosure 2 to extreme voltages, the charge is drained through the diode 8 and into the capacitor 10. The capacitance of the capacitor 10 is chosen to be much greater than the capacitance of the conducting enclosure 2 and switch 9 combined, so that the capacitor 10 is maintained at a nearly constant voltage. The load may drain the capacitor directly of its charge if a DC current is required, or use a DC to AC converter to generate an alternating current if one is required. In practice, field effect transistors (FETs) have been used for the switch 9, driven at cycle speeds around 1 to 5 megahertz using a solid state square wave generator. Although a relay, diode and larger capacitor system is shown and described for the controlling circuit, other circuits are possible, such as a relay and resistor which may be used to produce energy in the form of heat, or an inductor-capacitor oscillating circuit whose oscillation frequency coincides with the cycle frequency of the invention.

Figure 4:
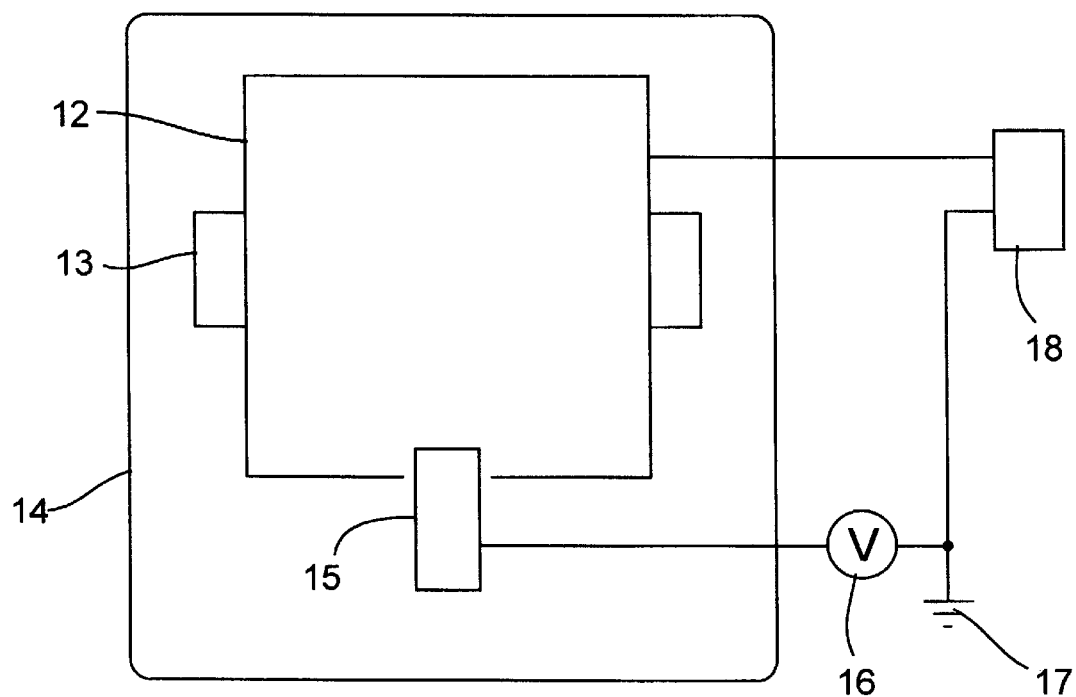
FIG. 4 is a cutaway schematic view of an alternative embodiment of the invention that uses a magnetic bottle.

FIG. 4 shows a cutaway schematic of another embodiment of the free-electron field-stacking system that uses a magnetic bottle to improve power efficiency. The cathode of the electron gun 15 produces a stream of free electrons in the energy range of −10 eV to −2000 eV, provided by the voltage source 16, which is directed into a conducting enclosure 12. This embodiment operates as previously described except that the electrons, rather than being directed to the other side of the conducting enclosure, are directed into a magnetic bottle as produced by the two aligned permanent magnets 13 located to either side of the conducting enclosure 12. By interning the free electrons temporarily in a magnetic bottle, the number of electrons in transit when the conducting enclosure is isolated from ground 17 is increased, thereby increasing the power efficiency. The controlling circuitry 18 is as described in the previous embodiments. The electron gun 15 and conducting enclosure are maintained in a vacuum by being sealed into a vacuum tight container 14 such as a glass vacuum tube.

Figure 5:
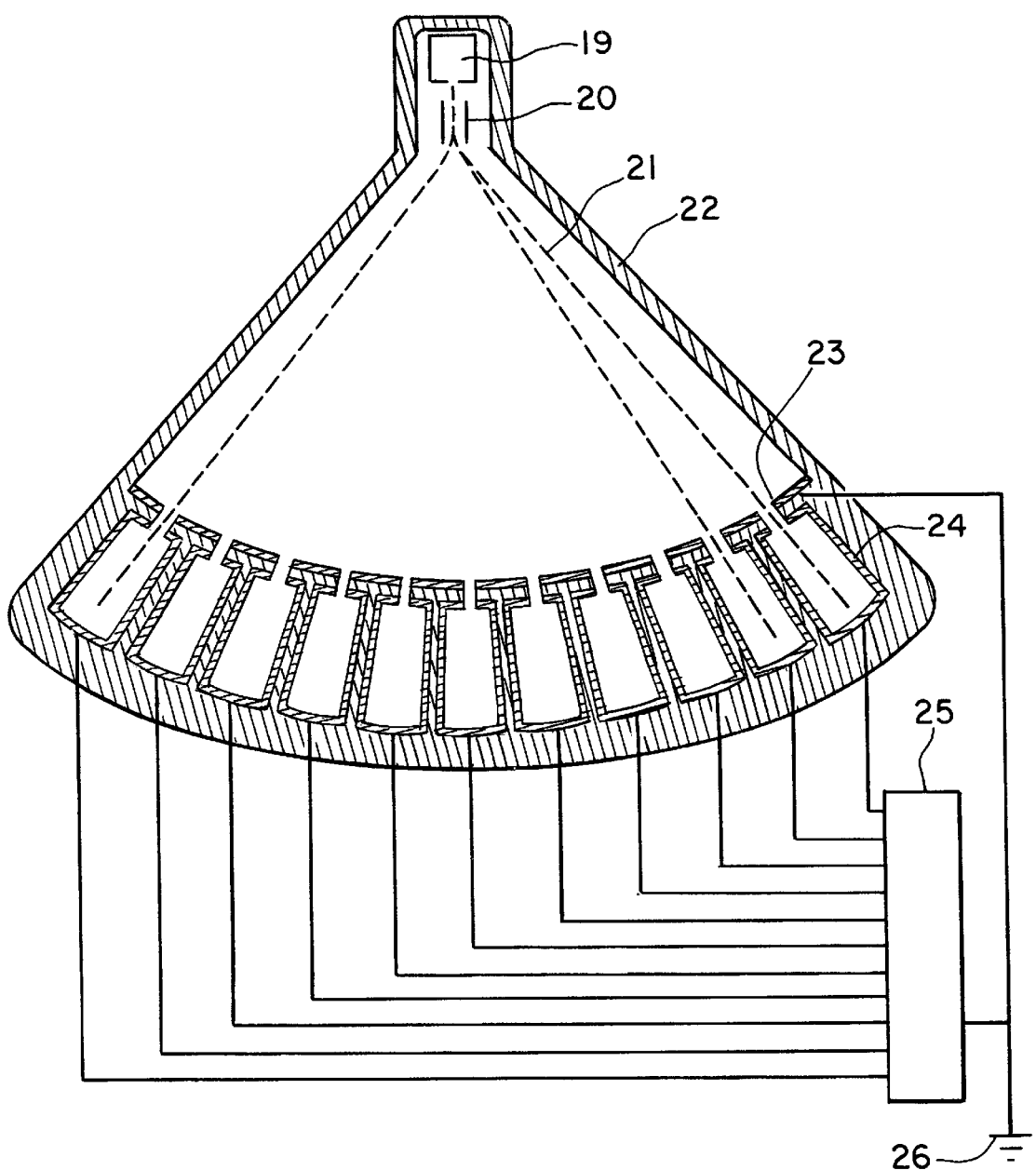
FIG. 5 is a cutaway schematic view of an embodiment of the invention that uses a plurality of conducting enclosures.

FIG. 5 shows another embodiment of the invention in which the conducting enclosure is configured as a plurality of conducting subenclosures. An electron gun 19, which produces a very high cathode current, is used to generate an electron stream that is deflected by the static charge maintained on two deflector plates 20. This static charge is varied over time to divert the cathode ray so that it will sweep cyclically between multiple conducting subenclosures 24 that are housed in a nonconducting vacuum enclosure 22, such as glass or ceramic, similar to a picture tube for a television. Any number of conducting subenclosures 24 can be used and are intended to provide a two-dimensional array both in the distribution shown as well as side by side into the page. A grounded shield 23 is used to prevent voltage effects between neighboring conducting enclosures that would cause an undesirable deflection of the cathode ray. The conducting subenclosures can be discharged as capacitors via conversion circuitry 25 that converts the induced voltage on the conducting subenclosure capacitors into whatever current and voltage are required by the load. A representation 21 of a few of the various paths of the output cathode ray of the electron gun 19 is shown.

In operation, the charge on the deflector plates 20 will be varied over time so as to deflect the electron stream 21 into the conducting enclosures, charging each in succession. That charge drains through the conversion circuit 25, which converts the power from the form of discharging conducting enclosures into a voltage, current and type (AC or DC) that can be used by the load.

Figure 6:
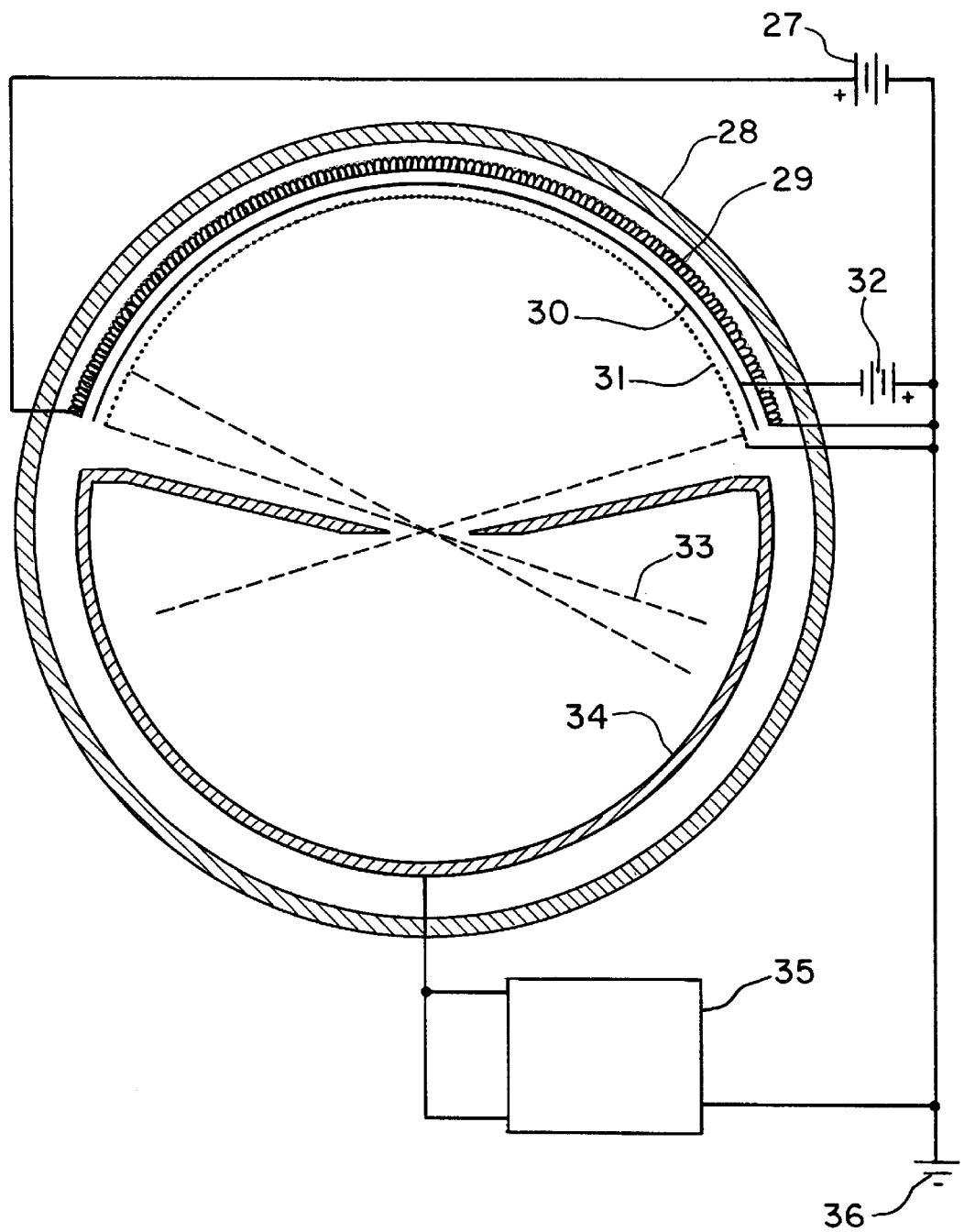
FIG. 6 is a cutaway schematic view of an embodiment of the invention that uses a hemispherical cathode.

FIG. 6 shows an embodiment in which the free electrons are concentrated by focusing an increased output into a smaller area. In one embodiment, this is accomplished by directing multiple electron guns through a confined region. In another embodiment an approximately hemispherical cathode 30 is used as shown. The hemispherical cathode is used in combination with a hemispherical acceleration grid 31 to focus its output such that it is significantly captured by the conducting enclosure 34. The cathode can be a heated type, such as an oxide coated cathode indirectly heated by the filament 29 as shown, or can be a cold cathode type. The electrons freed from the cathode are accelerated through the wire acceleration grid 31 by maintaining the cathode at a negative voltage relative to the conducting enclosure 34 by the voltage source 32. Due to the physical form of the cathode 30 and acceleration grid 31, the freed electrons will travel in such a way that they will converge upon the aperture in the conducting enclosure. The electron path 33 from the cathode into the conducting enclosure is shown. A current source 27 is provided to drive the heater filament 29. The cathode 30, heater filament 29, acceleration grid 31, and conducting enclosure 34 are maintained inside an evacuated, vacuum-tight enclosure 28. This embodiment is cycled as described for other embodiments above.

Figure 7:
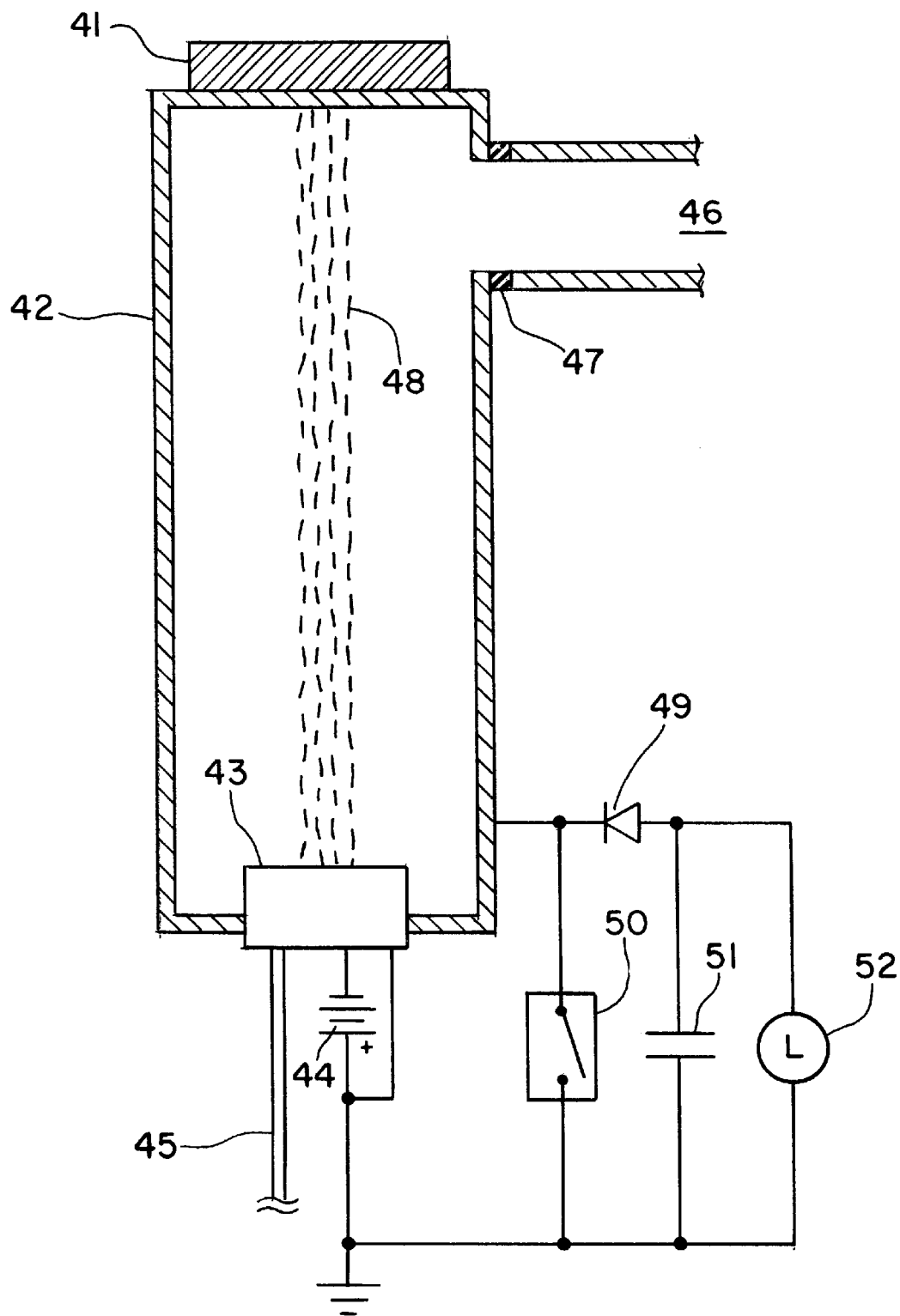
FIG. 7 is a cutaway schematic view of an embodiment of the invention that uses a gas flow.

A further embodiment additionally provides a gas flow within the conducting enclosure. This embodiment is illustrated in FIG. 7, which shows a cutaway schematic view. This embodiment is similar to that described with respect to FIG. 3, with the addition of the gas flow. An electron gun 43 is situated so that its output is directed into a conducting enclosure 42. The electron gun 43 may use a hot or cold cathode, but is pictured using a hot cathode powered by a current source 44. A permanent magnet 41 is provided to prevent the electrons from the electron gun 43 from spreading to the sides of the conducting enclosure 42, but rather to travel to the opposite end before coming into contact with the conducting enclosure 42, the magnet 41 causing them to travel in a helical path to the opposite end (as represented by the electron paths 48). A gas flow is provided through the connection 45, which connects the electron gun to a gas supply. In one embodiment, the gas is an inert gas such as helium or neon. The flow of gas past an active cathode such as in the electron gun 43 causes the free electrons to cluster around the gas molecules in high densities, providing a high-density, low-energy electron beam. In an embodiment, the conducting enclosure 42 is electrically connected to an electrical circuit comprising a switch 50, a capacitor 51, a diode 49 and whatever device, or load 52, is being driven. The gas is allowed to escape the conducting enclosure through a portal 46 that is isolated from the conducting enclosure 42 by an insulating connector 47. The portal 46 is connected to a high vacuum pump such as a turbo molecular pump to keep the inside of the conducting enclosure at a low pressure, such as less than $10^{-5}$ torr in one embodiment.

In operation, the switch 50 is closed initially so that the electrons from the electron gun 43 are be drawn into the interior of the conducting enclosure 42. The switch 50 is kept closed for a sufficient period of time for the electrons from the electron gun 43 to travel across the interior of the conducting enclosure 42 and begin impacting on the opposite end. At that time, the switch 50 is opened so that the electrons that are traveling across the interior cavity of the conducting enclosure 42 charge the conducting enclosure 42 as they come into contact with it rather than draining to ground. As in the previous discussion, the conducting enclosure 42 thereby acquires a voltage.

The capacitor 51 is maintained at a lesser voltage, typically limited by the breakdown voltage of the switch 50, so that rather than charging the conducting enclosure 42 to extreme voltages, the charge is drained through the diode 49 and into the capacitor 51. The capacitance of the capacitor 51 is chosen to be much greater than the capacitance of the conducting enclosure 42 and switch 50 combined, so that the capacitor 51 is maintained at a nearly constant voltage. The load may drain the capacitor directly of its charge if a DC current is required, or use a DC to AC inverter to generate an alternating current if one is required. In practice, field effect transistors (FETs) have been used for the switch 50, driven at cycle speeds around 1 to 5 megahertz using a solid state square wave generator.

Figure 8:
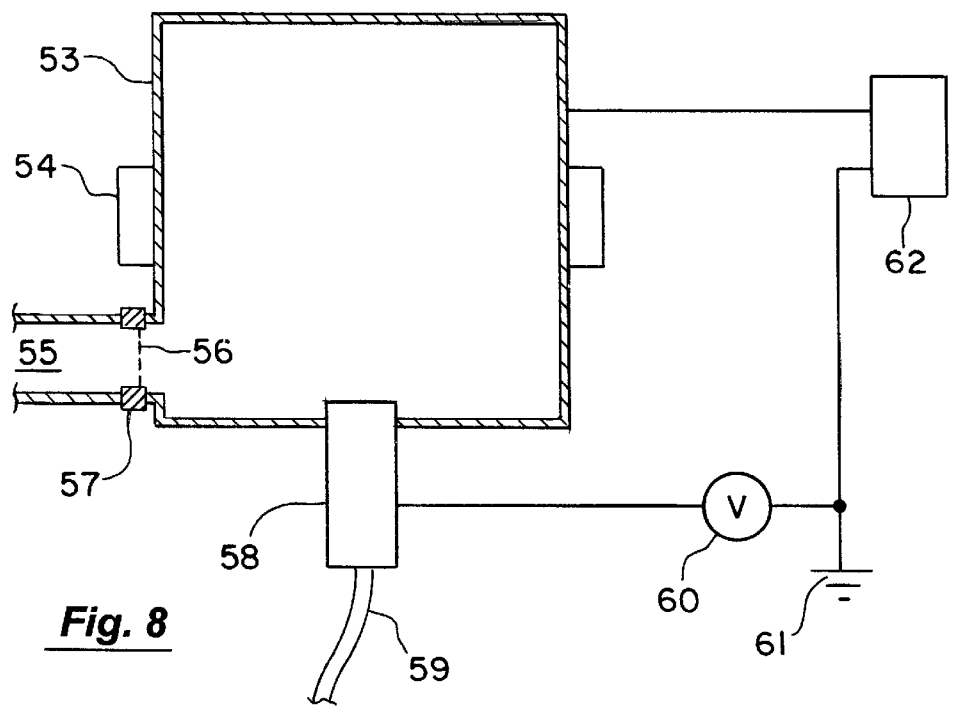
FIG. 8 is a cutaway schematic view of an embodiment of the invention that uses a gas flow with a magnetic bottle.

FIG. 8 shows a cutaway schematic view of an alternative embodiment that uses the gas flow in combination with a magnetic bottle to temporarily intern the electrons of the beam. An electron gun 58 is directed as before into a conducting enclosure 53. Again, the electron gun 58 may use a hot or cold cathode, with a hot cathode powered by a voltage source 60 shown. A high vacuum is maintained in the interior of the conducting enclosure 53. Two permanent or electromagnets 54 are placed to either side of the conducting enclosure 53 to produce a magnetic bottle that traps and interns the electrons of the beam temporarily before they are allowed to impact on the conducting enclosure surface.

As with the embodiment described with respect to FIG. 7, a gas flow is provided through connection 59, which connects the electron gun to a gas supply, which may be an inert gas such as helium or neon. The flow of gas past an active cathode such as in the electron gun 58 causes the free electrons to cluster around the gas molecules in very high densities, providing a high-density, low-energy electron beam. In addition, this form of electron gun allows the motivation of electrons into the conducting enclosure to be provided by the momentum of the gas molecules, which allows for electron energies of less than 1 eV, further increasing the charge density. The gas is allowed to escape the conducting enclosure through a portal 55 that is isolated from the conducting enclosure 53 by an insulating connector 57. A conducting grid 56 is provided to prevent the development of an extreme electrical field which would draw the electrons into the portal 55 rather than their impacting on the conducting enclosure 53. The portal 55 is connected to a high vacuum pump such as a turbo molecular pump so as to keep the inside of the conducting enclosure at a very low pressure, less than $10^{-5}$ Torr being typical. The switching and conversion circuit, which may be performed in any of a wide variety of fashions, is represented here by the circuit 62, and may be the same as the circuit shown in FIG. 3 or FIG. 7.

Figure 9:
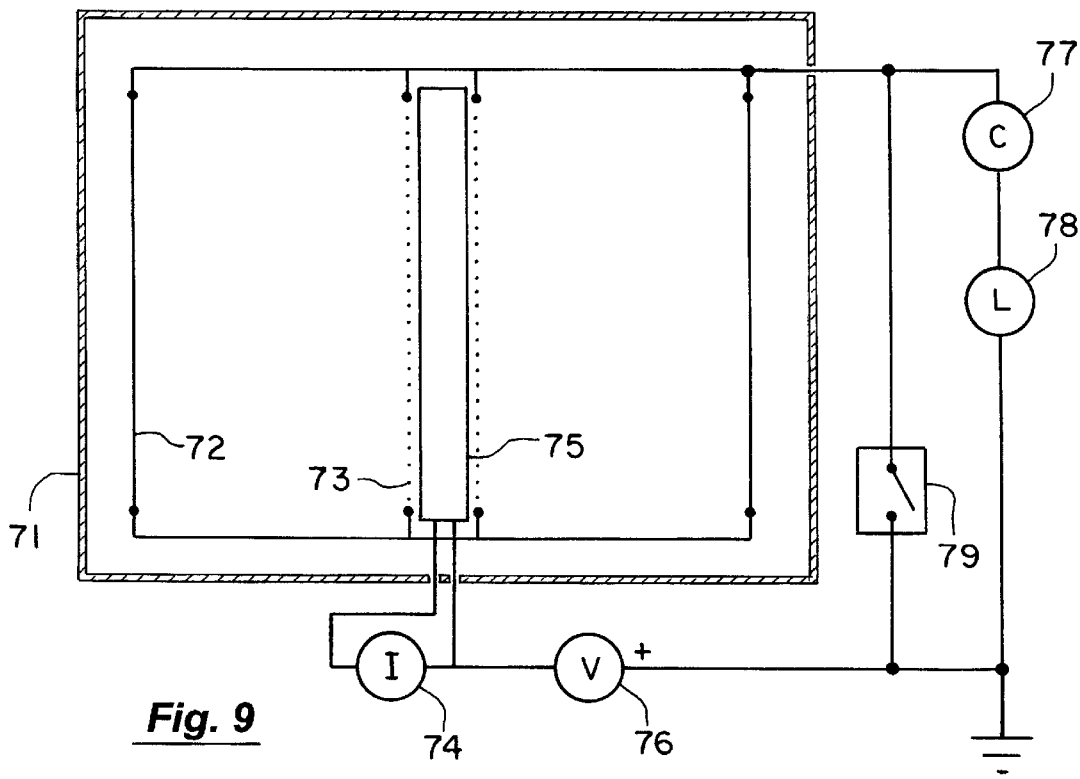
FIG. 9 is a cutaway schematic view of an embodiment of the invention that uses the formation of an electron cloud.

Another embodiment in which an acceleration grid is used to generate an electron cloud is illustrated in FIG. 9, which shows a cutaway schematic view. In this embodiment, the electron cloud forms during a first phase, which is followed by a second phase in which the electron cloud collapses into the grid. As illustrated in FIG. 9, a cylindrical cathode 75 is located at the center of a cylindrical acceleration grid 73 and conducting enclosure 72. The acceleration grid 73 and conducting enclosure 72 are electrically connected, and the conducting enclosure 72 completely surrounds the cathode 75 and acceleration grid 73. The cathode 75 is maintained at a lower voltage than the acceleration grid 73 and conducting enclosure 72 by a voltage source 76 and a current source 74 supplies a current to heat the cathode 75. The cathode 75, accelerating grid 73, and conducting enclosure 72 are maintained in a vacuum by means of a vacuum-sealed enclosure 71 such as the glass tube of a vacuum tube. In one embodiment, the conducting enclosure 72 and acceleration grid are electrically connected to an electrical circuit comprising a switch 79, a conversion unit 77 and whatever device, or load 78, is being driven by the present invention.

In operation, the switch 79 is closed initially so that the electrons from the cathode 75 are drawn through the acceleration grid 73 and into the space between the accelerating grid 73 and conducting enclosure 72. The switch 79 is kept closed for a sufficient period for the electrons from the cathode 75 to collect as a cloud in that region. Following that period, the switch 79 is opened so that the electrons of that cloud charge the accelerating grid 73 and conducting enclosure 72 as they come into contact with them rather than draining to ground. As for the previous embodiments, the conducting enclosure 72 thereby acquires a voltage. The load 78 may drain the capacitor directly of its charge or use a conversion unit 77 to generate current in the desired form. In practice, field effect transistors (FETs) have been used for the switch 79, driven at cycle speeds around 1 to 10 megahertz using a solid-state square wave generator.

Figure 10:
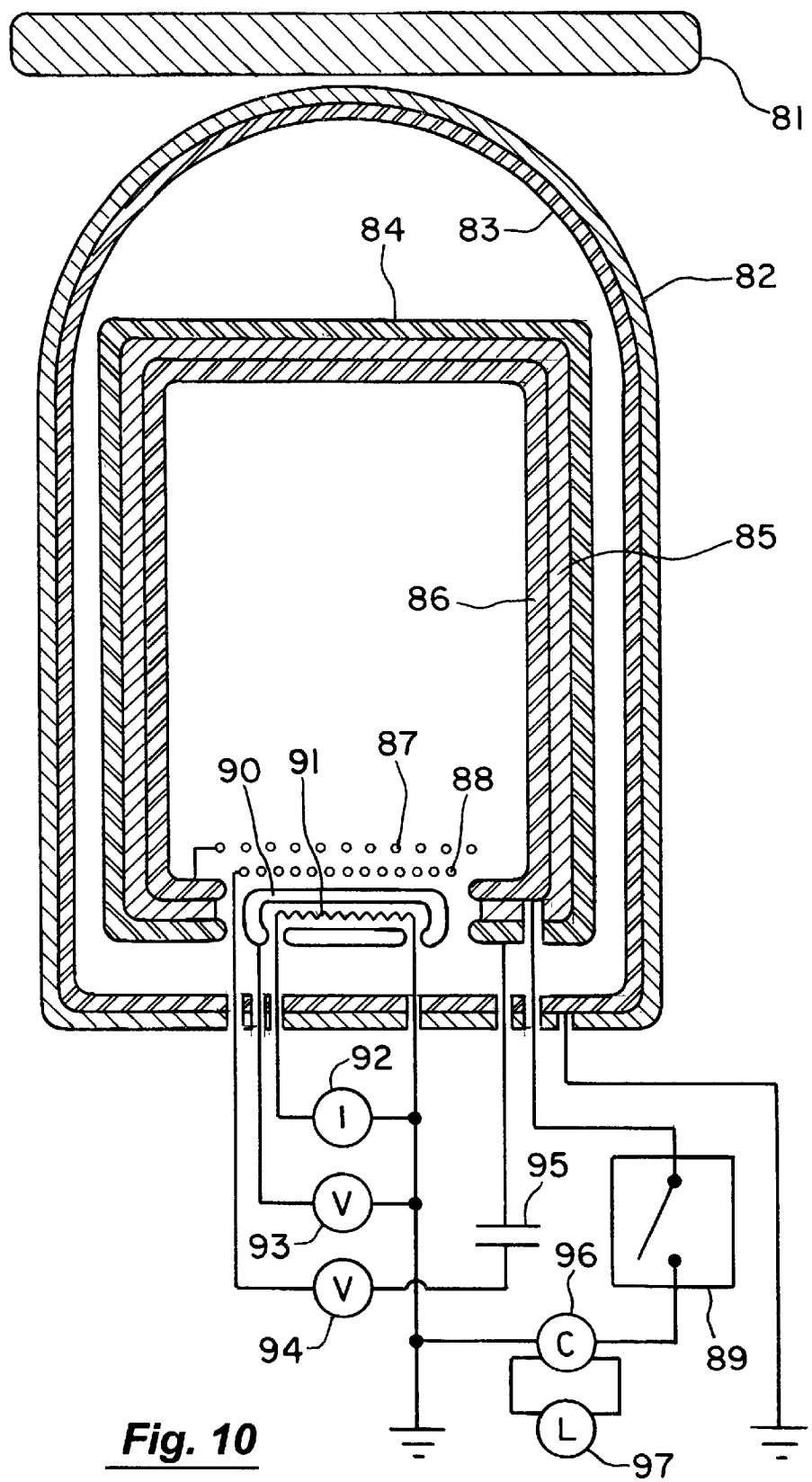
FIG. 10 is a cutaway schematic view of an embodiment of the invention in which oscillations are generated from changes in the electron stream.
Figure 11:
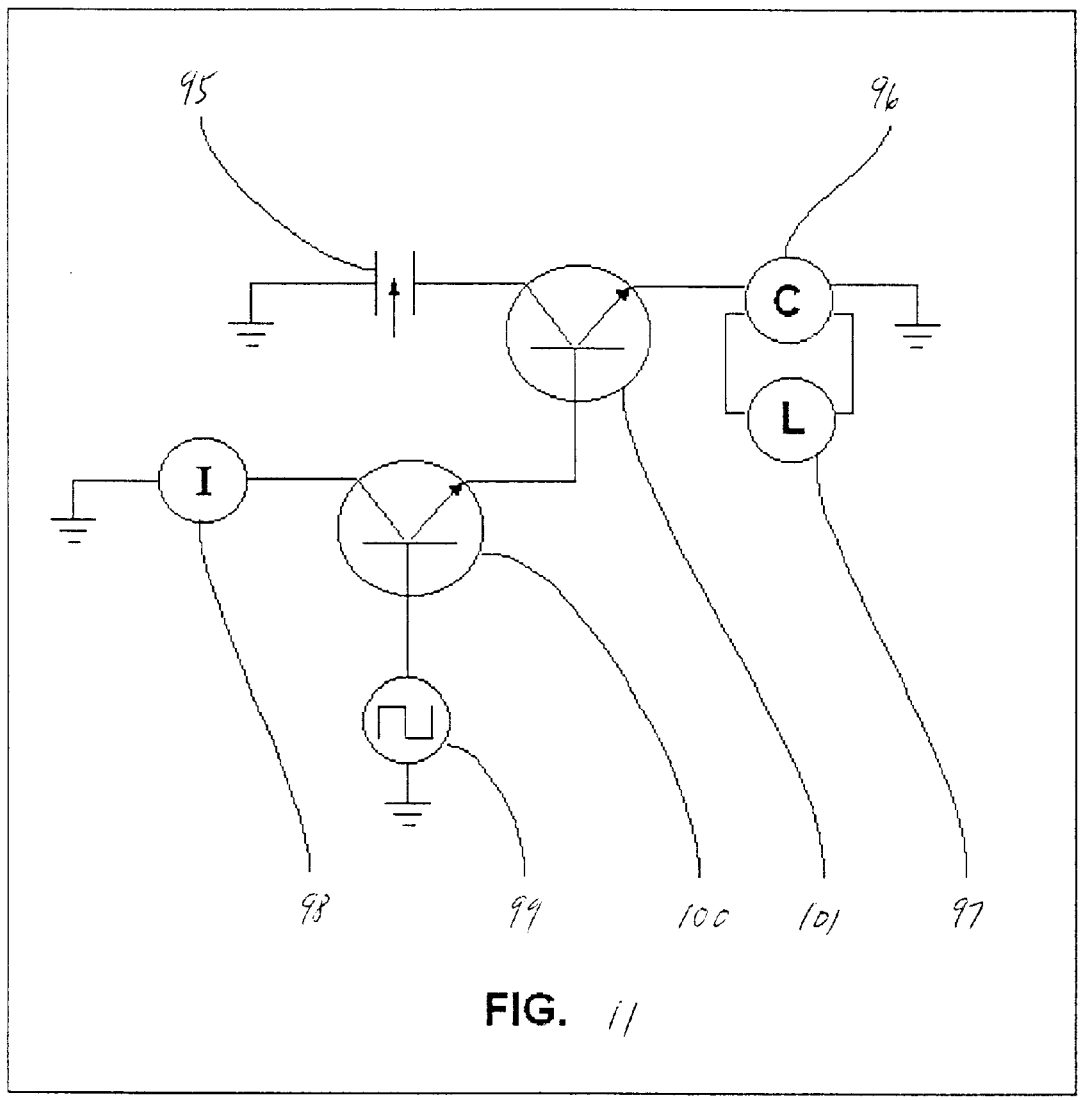
FIG. 11 illustrates a circuit arrangement used in the embodiment that induces oscillations from changes in the electron stream.

In FIGS. 10 and 11 is illustrated still another embodiment in which changes in the flow of the electron stream are used to induce oscillations in the device. In particular, the known fact that the current provided by vacuum-tube devices has a tendency to oscillate is exploited. FIG. 10 provides a cutaway schematic view of such an embodiment. A cathode 90 is heated by a resistance heater 91. The electrons freed from the cathode are accelerated by a wire grid 88 which is held at a voltage of around +10 volts relative to the cathode. The cathode 90, heater 91 and accelerating wire grid 88 effectively comprise an electron gun for this embodiment. The electrons are then decelerated through the use of a second wire grid 87 that is connected to the entrapping capacitor 86. The wire grids 88 and 87 may comprise a series of parallel and closely spaced wires, which are shown as a series of wire cross sections in the diagram. The cathode is maintained at a low negative voltage, such as −1 or −2 volts, relative to the conducting enclosure 72 so that the electrons are traveling with an energy of around one electron volt as they travel to the opposite side of the enclosing surface, at the top of FIG. 10.

The low energy of the electrons of the cathode ray acts to condense the electrons, increasing their density, improving the response. The entrapping capacitor 86 is connected or isolated from ground by means of a relay 89. The connection to ground is passed through a conversion device 96 that converts the energy in the form of a discharging capacitor to a form useful for load 97. The acceleration voltages for the cathode 90 and wire acceleration grid 88 are maintained by two voltage supplies 94 and 93 respectively. The cathode heater is powered by a power supply 92, which may be a separate battery in one embodiment. The enclosing capacitor 86 is itself enclosed by an outer conducting enclosure 84, such as a metal box, which acts as a second plate for the capacitor. The entrapping capacitor 86 and outer conducting enclosure 84 are held separate by an insulating medium 85 which may be glass, ceramic, mica or any other suitable substance. A capacitor 95 is placed electrically between the conducting enclosure 84 and ground. A relay 89 is placed between the entrapping capacitor 86 and ground and controls whether the entrapping capacitor is connected to or isolated from ground. The connection to ground for that relay is maintained through a conversion circuit 96 that converts the energy in the form of a discharging capacitor into a form useful for the load 97.

An external, permanent magnet 81 is provided to prevent the geomagnetic field or any other ambient magnetic field in the vicinity of the device from causing the electrons to be diverted from their path toward the opposite side of the enclosing capacitor 90. The field of the permanent magnet 81 is directed along the axis of the enclosing capacitor (up or down in the diagram) which will cause the electrons of the cathode ray to travel in helical path toward the upper wall of the entrapping capacitor 86. The system of the cathode, entrapping capacitor and enclosing surface are all enclosed in a vacuum chamber which consists of a metal casing 83 and glass or ceramic casing 82. The metal casing 83 is connected directly to ground, allowing it to shield the high voltages occurring for the entrapping capacitor 86 and enclosing conducting surface 84 from the surrounding air, which, if left unshielded, might cause the electrical breakdown of the surrounding air molecules resulting in sparks and dangerous electrical discharges. The capacitor 95 acts to modify the capacitance of the enclosing capacitor, allowing the output power level of the device to be readily controlled. Also, the voltage supplied by the voltage supplies 93 and 94 are variable to allow control of the cathode current.

The relay 89 of FIG. 10 may comprise any mechanism for switching the apparatus at a speed on the order of megahertz. One such relay is shown in FIG. 11. In this example, the switching mechanism is accomplished through the use of a high voltage transistor 101 driven by a lower voltage transistor 100. A current supply 98 is provided to drive the current of the lower voltage transistor 100, along with a square wave signal generator 99 to drive its base current and provide the switching operation. The output, emission current from the lower voltage transistor 100 is connected into the base of the high voltage transistor 101.

When the voltage of the square wave goes to a high voltage and current, the lower voltage transistor 100 passes current through to the emitter and to the base of the high voltage transistor 101. That, in turn allows the enclosing capacitor 95 to drain, effectively connecting it to ground. When the square wave signal falls to zero, the current from the emitter lead of transistor 100 falls to zero, so that current is blocked from passing through the high voltage transistor 101 so that the enclosing capacitor is effectively isolated from ground. The conversion circuit 96 and load 97 are as shown in FIG. 10.

The conversion circuit 96 may comprise any arrangement to convert the energy from the form of a discharging capacitor to a form useful for the load 97. In one embodiment, a pulse transformer is used to transform the pulse into a high-current, lower-voltage form that is then used to maintain a very high capacitance capacitor at a stable voltage, and that capacitor used to drive a DC to AC power inverter. The high capacitance capacitor may also be a battery or group of batteries. Such a conversion circuit uses principles commonly exploited to convert solar power and wind turbine generator outputs into useful forms.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for providing power to a load, the method comprising:
    directing a beam of free electrons from a free-electron source into an enclosing conductive surface, the free-electron source including a cathode;
    maintaining a region around the free-electron source in a vacuum;
    maintaining the cathode at a negative voltage with respect to the enclosing conductive surface;
    cyclically switching over a time period between a first configuration in which the enclosing conductive surface is isolated from a ground and a second configuration in which the enclosing conductive surface is in electrical communication with the ground;
    discharging capacitive energy from the enclosing conductive surface when in the second configuration; and
    providing the discharged capacitive energy to the load.

2. The method recited in claim 1 further comprising heating the cathode.

3. The method recited in claim 1 wherein directing the beam of free electrons comprises magnetically constraining a trajectory of the beam to ensure the free electrons travel to an end of the enclosing conductive surface opposite the free-electron source before contacting the enclosing conductive surface.

4. The method recited in claim 1 wherein directing the beam of free electrons comprises slowing the free electrons.

5. The method recited in claim 1 wherein directing the beam of free electrons comprises temporarily interning the free electrons in a magnetic bottle.

6. The method recited in claim 1 wherein directing the beam of free electrons comprises flowing a gas in a direction from the free-electron source towards an end of the enclosing conductive surface.

7. The method recited in claim 1 wherein the enclosing conductive surface comprises a plurality of conductive subenclosures housed within a nonconducting vacuum enclosure, each of the subenclosures being shielded from other subenclosures, and wherein directing the beam of free electrons comprises sucessively deflecting the beam into the conductive subenclosures over the time period.

8. The method recited in claim 1 further comprising forming a cloud of free electrons, wherein the beam of free electrons is derived from the cloud of free electrons.

9. A device for providing power to a load, the device comprising:
    a free-electron source configured to provide a beam of free electrons, the free-electron source including a cathode;
    an enclosing conductive surface configured to receive the beam of free electrons, wherein the cathode is maintained at a negative voltage with respect to the enclosing conductive surface;
    a vacuum container configured to maintain a region around the free-electron source in a vacuum;
    a switch adapted to cycle over a time period between a first configuration in which the enclosing conductive surface is isolated from a ground and a second configuration in which the enclosing conductive surface is in electrical communication with the ground;
    an electrical circuit arrangement configured to be in electrical communication with the enclosing conductive surface when the switch is in the second configuration and to provide energy capacitively discharged from the enclosing conductive surface to the load.

10. The device recited in claim 9 wherein the electrical circuit arrangement includes an inductor and a capacitor configured to provide sinusoidal current oscillations.

11. The device recited in claim 9 further comprising a heat source configured for heating the cathode.

12. The device recited in claim 9 further comprising a permanent magnet configured with respect to the enclosing conductive surface to constrain a trajectory of the beam of free electrons to ensure the free electrons travel to an end of the enclosing conductive surface opposite the free-electron source before contacting the enclosing conductive surface.

13. The device recited in claim 9 further comprising an arrangement of permanent magnets that define a magnetic bottle for temporarily interning the free electrons.

14. The device recited in claim 9 further comprising a gas source configured to provide a flow of gas in a direction from the free-electron source towards an end of the enclosing conductive surface.

15. The device recited in claim 9 further comprising a conducting grid configured in electrical communication with the enclosing conductive surface to prevent charges from the enclosing conductive surface from being drawn into the free-electron source.

16. The device recited in claim 9 wherein the enclosing conductive surface comprises a plurality of conductive subenclosures housed within a nonconducting vacuum enclosure, each of the subenclosures being shielded from other subenclosures, the device further comprising a deflector plate configure to deflect the beam of free electrons successively into the conductive subenclosures over the time period.

17. The device recited in claim 9 wherein the free-electron source comprises a plurality of electron guns configured to direct the beam of free electrons through a confined region.

18. A device for providing power to a load, the device comprising:

free-electron-source means for providing a beam of free electrons, the free-electron-source means including cathode means;

conductive enclosing means configured to receive the beam of free electrons, wherein the cathode means is maintained at a negative voltage with respect to the conductive enclosing means;

vacuum means for maintaining a region around the free-electron-source means in a vacuum;

switch means adapted to cycle over a time period between a first configuration in which the conductive enclosing means is isolated from a ground and a second configuration in which the conductive enclosing means is in electrical communication with the ground;

electrical circuit means configured to be in electrical communication with the conductive enclosing means when the switch is in the second configuration and to provide energy capacitively discharged from the conductive enclosing means to the load.

19. The device recited in claim 18 further comprising heat means for heating the cathode means.

20. The device recited in claim 18 further comprising permanent magnet means for constraining a trajectory of the beam of free electrons to ensure the free electrons travel to an end of the conductive enclosing means opposite the free-electron-source means before contacting the conductive enclosing means.

21. The device recited in claim 18 further comprising gas flow means to provide a flow of gas in a direction from the free-electron source means towards an end of the conductive enclosing means.

22. The device recited in claim 18 wherein the electrical circuit means comprises inductance means and capacitance means configured to provide sinusoidal current oscillations.

* * * * *